United States Patent
Yamauchi

(10) Patent No.: US 7,450,519 B2
(45) Date of Patent: Nov. 11, 2008

(54) AUTO-NEGOTIATION MONITOR SYSTEM, REPEATING-TRANSMISSION APPARATUS, AND AUTO-NEGOTIATION MONITOR METHOD USED THEREFOR

(75) Inventor: Toshiro Yamauchi, Tokyo (JP)

(73) Assignee: NEC Corporation, Kanagawa (JP)

( * ) Notice: Subject to any disclaimer, the term of this patent is extended or adjusted under 35 U.S.C. 154(b) by 914 days.

(21) Appl. No.: 10/952,879

(22) Filed: Sep. 30, 2004

(65) Prior Publication Data
US 2005/0073965 A1   Apr. 7, 2005

(30) Foreign Application Priority Data
Oct. 1, 2003   (JP) .............................. 2003-342750

(51) Int. Cl.
*G01R 31/08* (2006.01)
(52) U.S. Cl. .................. 370/243; 370/244; 370/245; 370/246; 398/6; 398/11; 398/12; 398/16; 398/17
(58) Field of Classification Search ......... 370/242–246, 370/293, 216, 400; 398/1, 10–12, 16–20; 714/4, 25, 31
See application file for complete search history.

(56) References Cited

U.S. PATENT DOCUMENTS 4,451,916 A   5/1984   Casper et al.
5,436,750 A   7/1995   Kawano
5,440,418 A   8/1995   Ishimura et al.
5,884,041 A   3/1999   Hurwitz
2002/0021671 A1   2/2002   Quinlan

FOREIGN PATENT DOCUMENTS

EP   0939511 A2   9/1999
JP   2003-110585 A   4/2003

OTHER PUBLICATIONS

IEEE Standard 802.3, "3. Media Access Control Frame Structure", IEEE, 2002, Section One, pp. 38-43.
IEEE Standard 802.3, "36. Physical Coding Sublayer (PCS) and Physical Medium Attachment (PMA) Sublayer, Type 1000Base-X", IEEE, 2002, Section Three, pp. 32-77.
IEEE Standard 802.3, "37. Auto Negotiation Function, type 1000BaseX", IEEE, 2002, Section Three, pp. 78-101.

*Primary Examiner*—Ricky Ngo
*Assistant Examiner*—Kibrom T Hailu
(74) *Attorney, Agent, or Firm*—Sughrue Mion, PLLC

(57) ABSTRACT

Where each of switches opposed to each other detects optical-signal shutoff or optical-signal deterioration on the reception side of its port, the switch brings a link of the port down and outputs an auto-negotiation configuration code, as an LAN signal. Upon receiving the LAN signal transmitted from the switch, a repeating-transmission apparatus transmits the transmitted signal to an auto-negotiation monitor. The auto-negotiation monitor performs code analysis for the transmitted LAN signal. Where the auto-negotiation monitor detects that the transmitted LAN signal is the auto-negotiation configuration code, it notifies a monitor apparatus that "The switch detects a failure and the link is down.", as an alarm.

13 Claims, 6 Drawing Sheets

AUTO-NEGOTIATION MONITOR SYSTEM, REPEATING-TRANSMISSION APPARATUS, AND AUTO-NEGOTIATION MONITOR METHOD USED THEREFOR

BACKGROUND OF THE INVENTION

1. Field of the Invention

This application claims priority to prior application JP 2003-342750, the disclosure of which is incorporated herein by reference The present invention relates to an auto-negotiation monitor system, a repeating-transmission apparatus, and an auto-negotiation monitor method used therefor, and particularly relates to a technology for detecting a failure that occurs in a network for transferring an LAN (local area network) signal between switches via the repeating-transmission apparatus and determining the failure point.

2. Description of the Related Art

Usually, in a known network including Ethernet (a registered trademark) switches (hereinafter referred to as LAN switches) connected to each other with a long distance therebetween, a repeating-transmission apparatus is provided between the LAN switches for increasing the LAN-signal propagation distance (refer to Japanese Unexamined Patent Publication (JP-A) No. 2003-110585, for example).

In general, the repeating-transmission apparatus and the LAN switches are monitored by a monitor apparatus, so as to detect a failure and determine the failure point in the event of failure. However, where a failure occurs in an optical fiber on the reception side of the LAN switch, the failure can be detected only by the LAN switch, not by the repeating-transmission apparatus. That is to say, where a failure occurs in an optical fiber on the transmission side of the repeating-transmission apparatus, signal deterioration or optical-signal shut-off in the optical fiber can be detected only by the LAN switch. Though the repeating-transmission apparatus cannot monitor the signal deterioration, the optical-signal shutoff, and the link state of the LAN switches, this configuration presents no problem, as long as the monitor apparatus monitors the LAN switches and the repeating-transmission apparatus.

However, a problem may arise in the case where the LAN switches are not monitored by the monitor apparatus for some reason that the administrator or the monitor system for the LAN switches is different from that of the repeating-transmission apparatus. Where the administrator of the LAN switches is different from that of the repeating-transmission apparatus, the repeating-transmission apparatus is owned by a carrier for leasing lines and the LAN switch is owned by a customer of the carrier, for example. According to the above-described configuration, the monitor apparatus cannot monitor the LAN switch. Subsequently, the monitor apparatus cannot detect the failure in the reception-side optical fiber of the LAN switch and determine the failure point. Therefore, where a failure occurs in the reception-side optical fiber of the LAN switch, it takes much time to detect the failure, determine the failure point, and put the system back in order.

SUMMARY OF THE INVENTION

Accordingly, it is an object of the present invention to provide an auto-negotiation monitor system that can monitor the link state of LAN switches opposed to each other and determine which of the opposing LAN switches brought its link down.

Another object of the present invention is to provide a repeating-transmission apparatus suitable for the above-described auto-negotiation monitor system.

Still another object of the present invention is to provide an auto-negotiation monitor method used for the above-described repeating-transmission apparatus.

An auto-negotiation monitor system according to the present invention transfers local-area-network signals between opposing switches via at least one of repeating-transmission apparatus and monitors the repeating-transmission apparatus and the opposing switches by a monitor apparatus.

According to an aspect of the present invention, the repeating-transmission apparatus comprises a code discrimination block that receives the local-area-network signal transmitted from each of the opposing switches and that determines whether or not a predetermined code for auto-negotiation exists by monitoring the local-area-network signal, where the auto-negotiation is performed for establishing connection between the opposing switches. The repeating-transmission apparatus further comprises an alarm unit for determining which of the switches transmitted the predetermined auto-negotiation code that arrived earlier than the other, where the code discrimination unit determines that the predetermined auto-negotiation code exists, and notifying the monitor apparatus of the determination result, as an alarm.

According to another aspect of the present invention, a repeating-transmission apparatus is provided between opposing switches opposed to each other for repeating and transferring a local-area-network signal. The repeating-transmission apparatus is monitored by a monitor apparatus, with the opposing switches.

The repeating-transmission apparatus includes a code discrimination block that receives the local-area-network signal transmitted from each of the opposing switches and that determines whether or not a predetermined code for auto-negotiation exists by monitoring the local-area-network signal, where the auto-negotiation is performed for establishing connection between the opposing switches. The repeating-transmission apparatus further includes an alarm unit for determining which of the opposing switches transmitted the predetermined auto-negotiation code that arrived earlier than the other, where the code discrimination unit determines that the predetermined auto-negotiation code exists, and notifying the monitor apparatus of the determination result, as an alarm.

According to still another aspect of the present invention, an auto-negotiation monitor method is provided for transferring local-area-network signals between opposing switches opposed to each other via at least one repeating-transmission apparatus and monitoring the repeating-transmission apparatus and the opposing switches by a monitor apparatus.

The auto-negotiation monitor method comprises the steps of receiving the local-area-network signal transmitted from each of the opposing switches and determining whether or not a predetermined code for auto-negotiation performed for establishing connection between the opposing switches exists by monitoring the transmitted local-area-network signal. The auto-negotiation monitor method further comprises the steps of determining which of the opposing switches transmitted the predetermined auto-negotiation code that arrived earlier than the other, where the existence of the predetermined auto-negotiation code is determined, and notifying the monitor apparatus of the determination result, as an alarm.

DESCRIPTION OF THE PREFERRED EMBODIMENTS

Figure 1:
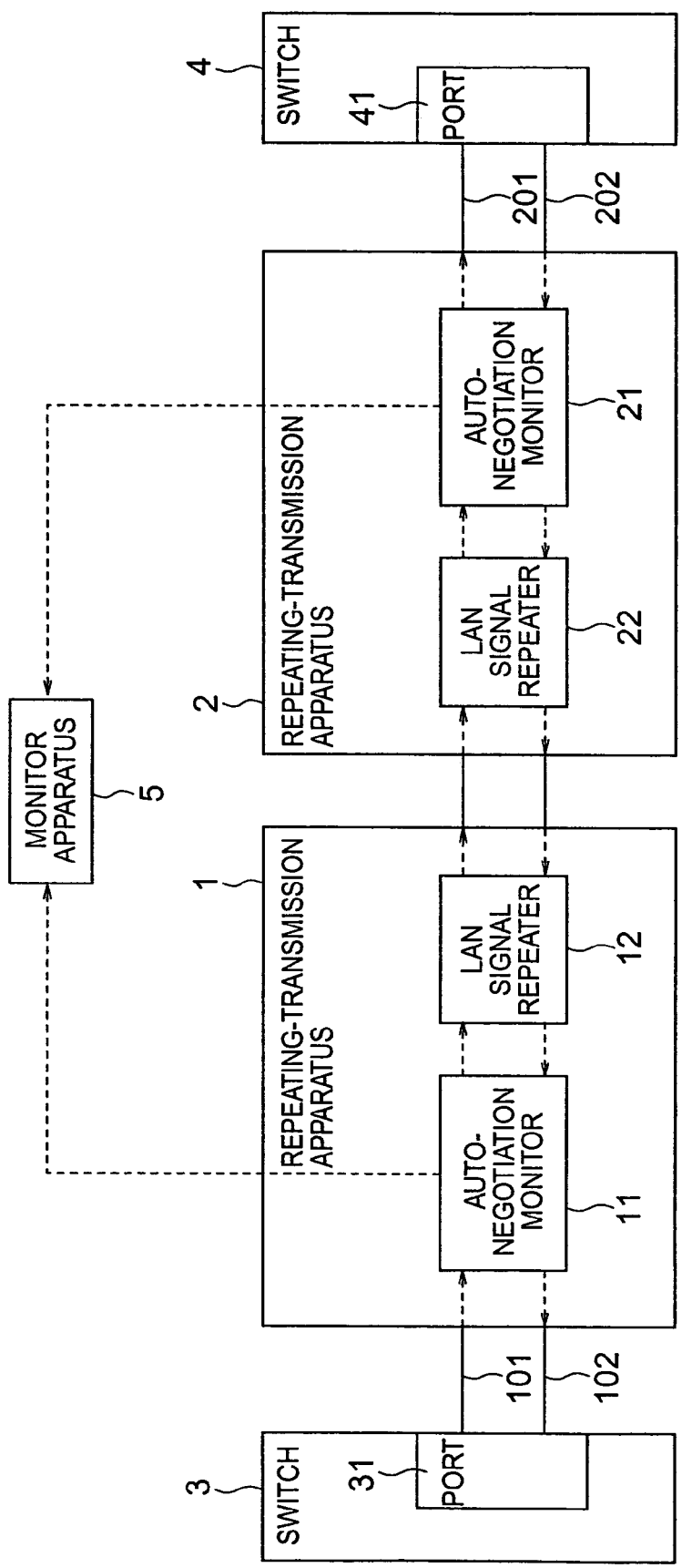
FIG. 1 is a block diagram illustrating the configuration of an auto-negotiation monitor system according to a first embodiment of the present invention.

The concepts of the present invention will be described prior to embodiments of the present invention.

An auto-negotiation monitor system of the present invention has the function of monitoring auto-negotiation configuration codes that are output from opposing LAN switches by an apparatus for repeating and transmitting an Ethernet (a registered trademark) (hereinafter referred to as LAN) signal without terminating an MAC (media access control) layer. Here, an MAC switch may be used as a substitute for the LAN switch. Hereinafter, the above-described switches will be referred to as switches.

The auto-negotiation function is defined in IEEE 802.3 "3. Media access control frame, structure" (hereinafter referred to as Document 1) and IEEE 802.3 "36. Physical Coding Sublayer (PCS) and Physical Medium Attachment (PMA) sublayer, type 1000BASE-X" (hereinafter referred to as Document 2). The switch used for the present invention has the above-described auto-negotiation function.

Where a failure occurs, the switch detects the failure, brings the link of its port down, and transmits the auto-negotiation configuration code.

Here, where the 1000BASE-X auto-negotiation is performed, the auto-negotiation configuration code (/C/Ordered set) is transmitted, in place of a link-test pulse signal used for auto-negotiation performed for automatically switching between 10BASE and 100BASE. Accordingly, it becomes possible to determine that the opposing switches are normally connected to each other.

That is to say, according to the 1000BASE-X auto-negotiation defined in Documents 1 and 2, two network apparatuses transmit information about an operable mode to each other before starting data transmission and reception therebetween so that a predetermined operation mode suitable for each of the two network apparatuses can be selected.

The 1000BASE-X auto-negotiation is performed by exchanging the auto-negotiation configuration code (/C/Ordered set) between the two network apparatuses. Where the auto-negotiation is finished, linkup is established between the two network apparatuses so that data transmission and reception can be performed therebetween. In a link_ok (linkup) state, the network apparatuses do not transmit the configuration code (/C/Ordered set).

Thus, in the auto-negotiation monitor system, the repeating-transmission apparatus confirms LAN signals transmitted from the switches and monitors the auto-negotiation configuration code transmitted from the switches, whereby the above-described objects are achieved.

More specifically, where a failure occurs in an optical fiber on the reception side of one of the switches, the switch brings the link of its port down according to the definition described in Documents 1 and 2, and transmits the auto-negotiation configuration code (/C/Ordered set).

Upon receiving the auto-negotiation configuration code transmitted from the switch, the other switch brings the link of a reception port down and transmits the auto-negotiation configuration code.

The repeating-transmission apparatus monitors the LAN signal transmitted from one of the switches and the other LAN signal transmitted from the other switch, and determines which of the two switches transmitted the auto-negotiation configuration code that arrived earlier than the other. According to the determination result, the auto-negotiation monitor system can determine which of the two switches detected the failure and brought the port link down.

The repeating-transmission apparatus notifies a monitor apparatus of the determination result, as an alarm. For example, upon receiving the auto-negotiation configuration code that was transmitted from one of the two switches and that arrived earlier than the other, the repeating-transmission apparatus determines that the switch detected a failure and brought the link of its port down, and notifies the monitor apparatus of information about the determination.

Thus, in the auto-negotiation monitor system, the repeating-transmission apparatus monitors the auto-negotiation configuration codes transmitted from the opposing switches. The repeating-transmission apparatus determines which of the two switches transmitted the auto-negotiation configuration code earlier than the other switch, thereby determining which of the two switches detected a failure. As a result, where a failure occurs in an optical fiber on the transmission side of the repeating-transmission apparatus, the repeating-transmission apparatus can detect the failure occurrence.

Accordingly, in the auto-negotiation monitor system, the repeating-transmission apparatus monitors the auto-negotiation configuration codes transmitted from the LAN switches. That is to say, the repeating-transmission apparatus can monitor the link state of two LAN switches and which of the LAN switches transmitted the auto-negotiation configuration code earlier than the other switch. Subsequently, the repeating-transmission apparatus can detect a failure that cannot be detected by a known repeating-transmission apparatus, such as a failure occurs in an optical fiber on the reception side of the LAN switch.

The reasons why it is possible to monitor the link state of the LAN switch by monitoring the auto-negotiation configuration codes will be described. As defined in Documents 1 and 2, the LAN switch performs LAN-frame transmission (transmission of /D/Code group, /S/Ordered set, and /T/Ordered set), or transmission of a code indicating the idle state (transmission of /I/Ordered set), where the port of the LAN switch is in the link_ok state. Where a failure is detected, the LAN switch brings the link of its port down and transmits the auto-negotiation configuration code (/C/Ordered set).

Referring to FIG. 1, an embodiment of the auto-negotiation monitor system according to the present invention will be described. FIG. 1 is a block diagram illustrating the configuration of an auto-negotiation monitor system according to a first embodiment of the present invention.

In FIG. 1, the auto-negotiation monitor system includes repeating-transmission apparatuses 1 and 2, switches 3 and 4, and a monitor apparatus 5. The repeating-transmission apparatus 1 and the switch 3 are connected to each other by optical fibers 101 and 102, and the repeating-transmission apparatus 2 and the switch 4 are connected to each other by optical fibers 201 and 202. The switches 3 and 4 are connected to each other via the repeating-transmission apparatuses 1 and 2.

Each of the switches 3 and 4 is formed as the LAN switch such as the Ethernet (a registered trademark) switch, or the MAC switch. Each of the switches 3 and 4 has the function of transferring a frame and the auto-negotiation function that is defined in Documents 1 and 2. The switch 3 includes a port 31 and the switch 4 includes a port 42.

The repeating-transmission apparatus 1 includes an auto-negotiation monitor 11 and an LAN-signal repeater 12, so as to repeat and transmit an LAN signal without terminating an MAC layer. The repeating-transmission apparatus 2 includes an auto-negotiation monitor 21 and an LAN-signal repeater 22, so as to repeat and transmit the LAN signal without terminating the MAC layer.

The LAN signal output from the port 31 is input to the repeating-transmission apparatus 1. The auto-negotiation monitor 11 performs code analysis for the LAN signal input to the repeating-transmission apparatus 1. The LAN signal is converted by the LAN-signal repeater 12 for repeating-transmission and transmitted to the repeating-transmission apparatus 2. The signal input to the repeating-transmission apparatus 2 is converted back to the LAN signal by the LAN-signal repeater 22, subjected to code analysis by the auto-negotiation monitor 21, and transmitted to the switch 4.

The LAN signal output from the port 41 is input to the repeating-transmission apparatus 2. The input LAN signal is subjected to code analysis by the auto-negotiation monitor 21, converted for repeating-transmission by the LAN-signal repeater 22, and transmitted to the repeating-transmission apparatus 1. The signal input to the repeating-transmission apparatus 1 is converted back to the LAN signal by the LAN-signal repeater 12, subjected to code analysis by the auto-negotiation monitor 11, and transmitted to the switch 3.

Here, the LAN-signal repeaters 12 and 22 may have any configurations so long as they can repeat and transmit an LAN signal. That is to say, any system can be used for the LAN-signal repeaters 12 and 22. For example, an SONET/SDH (Synchronous Optical NETwork/Synchronous Digital Hierarchy) system, a WDM (Wavelength Division Multiplexing) system, and so forth, may be used.

Figure 2:
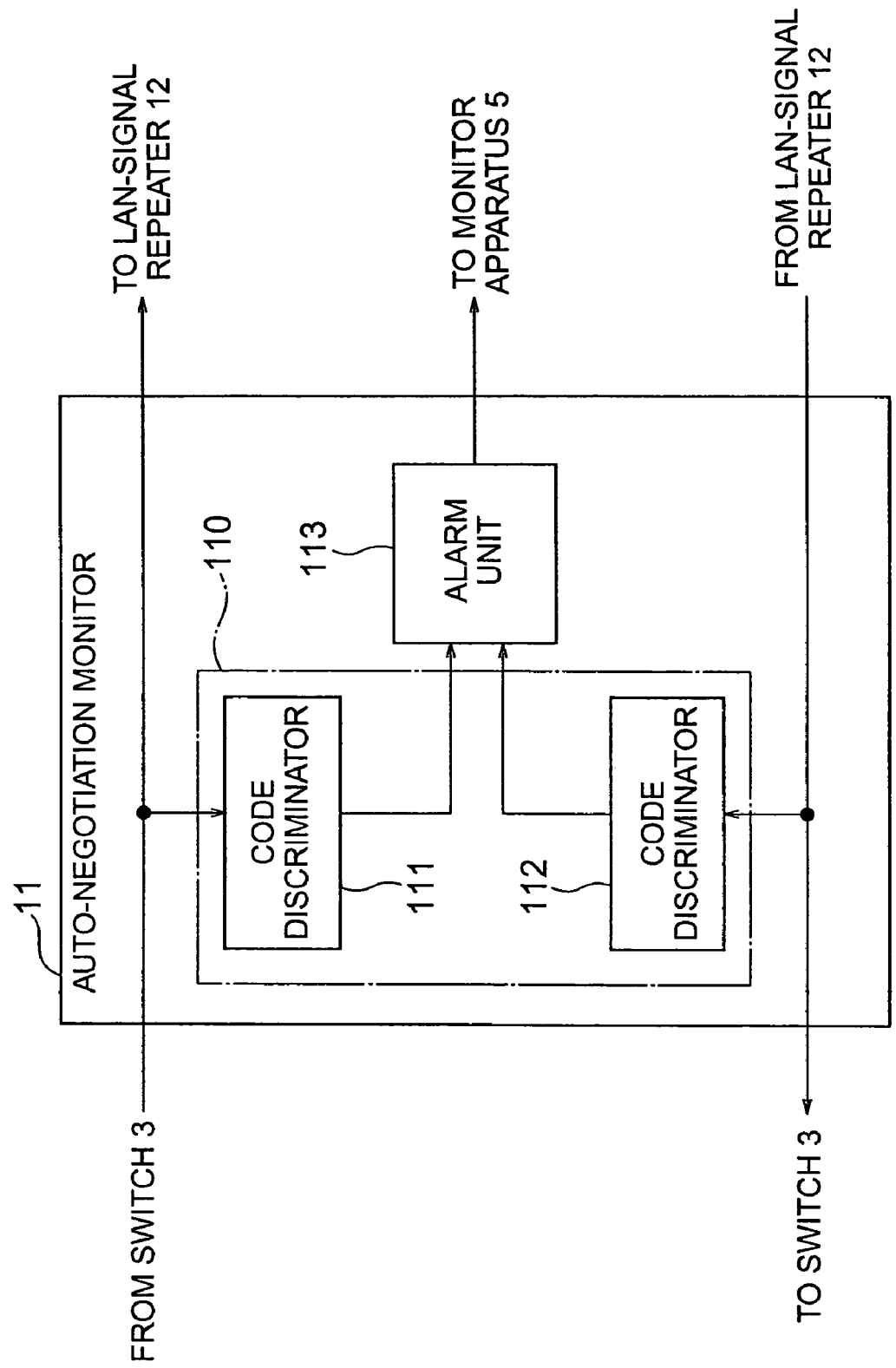
FIG. 2 is a block diagram illustrating the configuration of one of two auto-negotiation monitors shown in FIG. 1.

FIG. 2 is a block diagram illustrating the configuration of the auto-negotiation monitor 11 shown in FIG. 1. In this drawing, the auto-negotiation monitor 11 has a code discriminator 111 (a first code discriminator) for discriminating a code defined in Documents 1 and 2 from a signal that is input thereto, a code discriminator 112 (a second code discriminator) for discriminating a code defined in Documents 1 and 2 from a signal that is output therefrom, and an alarm unit 113 connected to the code discriminators 111 and 112. The code discriminators 111 and 112 collectively serve as a code discrimination block 110.

The code discriminator 111 performs code analysis for the input signal and transmits a notification to the alarm unit 113 upon receiving the auto-negotiation configuration code (/C/Ordered set). Upon receiving the code indicating the idle state (/I/Ordered set), or a code indicating data (/D/Code group, /S/Ordered set, and /T/Ordered set) for a time period longer than predetermined time period T1, the code discriminator 111 cancels the alarm notification transmitted to the alarm unit 113.

The code discriminator 112 performs code analysis for an output signal and transmits a notification to the alarm unit 113, where the auto-negotiation configuration code (/C/ordered set) is transmitted thereto. Upon receiving the code indicating the idle state (/I/Ordered set), or the code indicating data (/D/Code group, /S/Ordered set, and /T/Ordered set) for a time, period longer the predetermined time period T1, the code discriminator 112 cancels the alarm notification transmitted to the alarm unit 113.

Upon receiving the notification from the code discriminator 111, the alarm unit 113 issues an alarm for notifying the monitor apparatus 5 that the switch 3 opposed to the repeating-transmission apparatus 1 detected a failure and the link is down. Upon receiving the notification from the code discriminator 112, the alarm unit 113 issues an alarm for notifying the monitor apparatus 5 that the switch 4 opposed to the repeating-transmission apparatus 2 detected a failure and the link is down.

However, where the alarm unit 113 receives the notifications transmitted from both the code discriminators 111 and 112, the alarm unit 113 places a higher priority on the notification that arrived earlier than the other. That is to say, where the alarm unit 113 receives the notification transmitted from the code discriminator 112 after receiving the notification transmitted from the code discriminator 111, the alarm unit 113 does not perform anything.

Where the notification, which caused the alarm unit 113 to issue the alarm for the monitor apparatus 5 and is transmitted from either the code discriminator 111 or the code discriminator 112, is canceled, the alarm unit 113 cancels the alarm issued to the monitor apparatus 5 after predetermined time period T2 elapses. Further, during the predetermined time period T2 after the above-described notification transmitted from the code discriminator 111 or the code discriminator 112 is cancelled until the alarm issued to the monitor apparatus 5 is cancelled, the alarm unit 113 does not issue an alarm to the monitor apparatus 5 upon receiving another notification transmitted from either the code discriminator 111 or the code discriminator 112.

Figure 3:
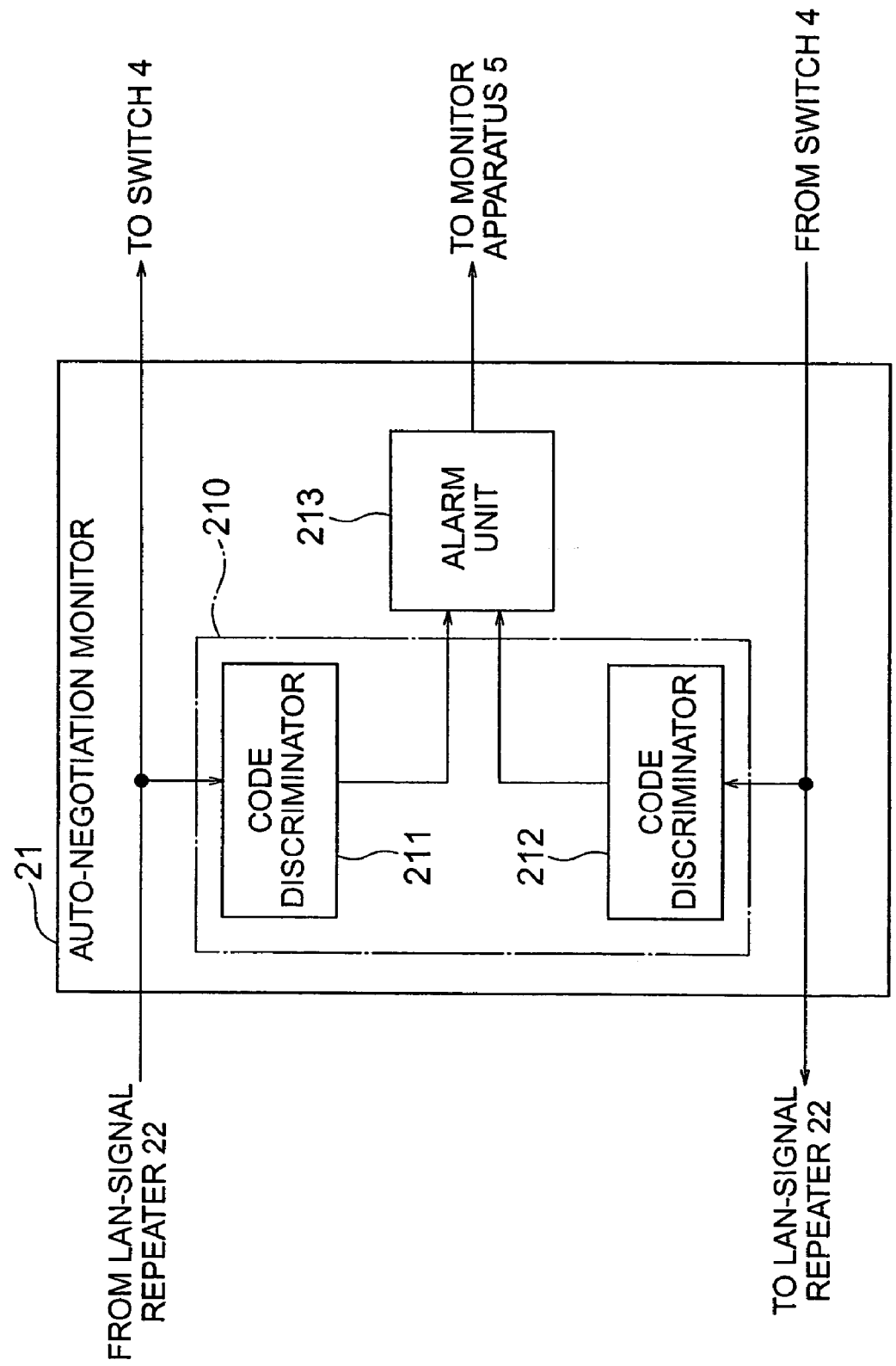
FIG. 3 is a block diagram illustrating the configuration of the other auto-negotiation monitor shown in FIG. 1.

FIG. 3 is a block diagram illustrating the configuration of the auto-negotiation monitor 21 shown in FIG. 1. In this drawing, the configuration of the auto-negotiation monitor 21 is the same as that of the auto-negotiation monitor 11 shown in FIG. 2. The auto-negotiation monitor 21 has a code discriminator (second code discriminator) 211 for discriminating the code defined in Documents 1 and 2 from an input signal, a code discriminator (first code discriminator) 212 for discriminating the code defined in Documents 1 and 2 from an output signal, and an alarm unit 213. The code discriminators 211 and 212 collectively serve as a code discrimination block 210.

Since the functions of the code discriminators 211 and 212, and the alarm unit 213 are the same as those shown in FIG. 2, the description thereof is omitted here.

Figure 4:
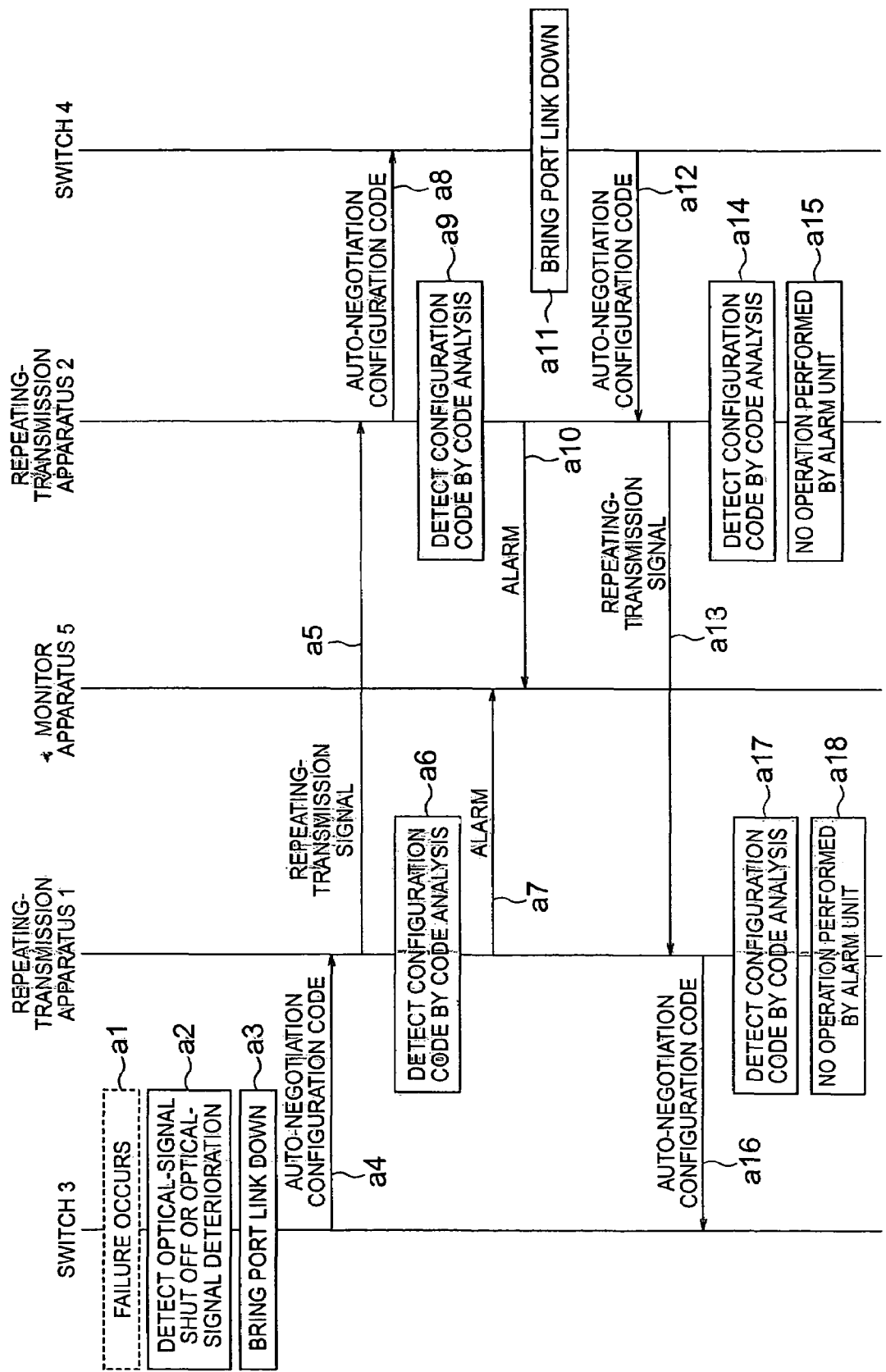
FIG. 4 is a sequence chart illustrating operations performed, where a failure occurs therein, in the auto-negotiation monitor system of the first embodiment.

FIG. 4 is a sequence chart for illustrating operations performed, where a failure occurs in the auto-negotiation monitor system according to this embodiment.

Referring to FIGS. 1 to 4, operations performed, where a failure occurs in the optical fiber 102 on the reception side of the switch 3 in the auto-negotiation monitor system, will now be described.

Where the failure occurs in the optical fiber 102 (a1 in FIG. 4), the switch 3 detects optical-signal shutoff or optical-signal deterioration on the reception side of the port 31 (a2 in FIG. 4), brings the link of the port 31 down (a3 in FIG. 4), and outputs an auto-negotiation configuration code (/C/Ordered set), as an LAN signal (a4 in FIG. 4).

Upon receiving the LAN signal transmitted from the switch 3, the repeating-transmission apparatus 1 transmits the LAN signal to the auto-negotiation monitor 11. The auto-negotiation monitor 11 transmits the input LAN signal to the code discriminator 111 and the LAN-signal repeater 12.

The code discriminator 111 performs code analysis for the input LAN signal. Then, where the code discriminator 111 detects that the input LAN signal is the auto-negotiation configuration code (a6 in FIG. 4), the code discriminator 111 transmits a notification to the alarm unit 113. Upon receiving the notification transmitted from the code discriminator 111, the alarm, unit 113 issues an alarm to the monitor apparatus 5, where the alarm indicates that "the switch 3 detected a failure and the link is down" (a7 in FIG. 4).

The LAN-signal repeater 12 converts the transmitted LAN signal into a repeating-transmission signal to be repeated and transmitted to the repeating-transmission apparatus 2, and transmits the repeating-transmission signal to the repeating-transmission apparatus 2 (a5 in FIG. 4).

In the repeating-transmission apparatus 2, the LAN-signal repeater 22 converts the signal transmitted from the repeating-transmission apparatus 1 to the LAN signal and transmits the LAN signal to the auto-negotiation monitor 21. The auto-negotiation monitor 21 transmits the LAN signal to the code discriminator 211 and the switch 4 (a8 in FIG. 4).

The code discriminator 211 performs code analysis for the input LAN signal. Then, where the code discriminator 211 detects that the input LAN signal is the auto-negotiation configuration code (a9 in FIG. 4), the code discriminator 211 transmits a notification to the alarm unit 213. Upon receiving the notification transmitted from the code discriminator 211, the alarm unit 213 issues an alarm to the monitor apparatus 5, where the alarm indicates that "the switch 3 detected a failure and the link is down" (a10 in FIG. 4).

Upon receiving the auto-negotiation configuration code, the switch 4 brings the link of the port 41 down (a11 in FIG. 4) and outputs the auto-negotiation configuration code, as the LAN signal (a12 in FIG. 4).

Upon receiving the LAN signal transmitted from the switch 4, the repeating-transmission apparatus 2 transmits the LAN signal to the auto-negotiation monitor 21. The auto-negotiation monitor 21 transmits the LAN signal to the code discriminator 212 and the LAN-signal repeater 22. The code discriminator 212 performs code analysis for the transmitted LAN signal. Then, where the code discriminator 212 detects that the transmitted LAN signal is the auto-negotiation configuration code (a14 in FIG. 4), the code discriminator 212 transmits a notification to the alarm unit 213. Since the alarm unit 213 had received the notification from the code discriminator 211, the alarms unit 213 does not perform anything upon receiving the notification transmitted from the code discriminator 212 (a15 in FIG. 4).

The LAN-signal repeater 22 converts the transmitted LAN signal into a repeating-transmission signal to be repeated and transmitted to the repeating-transmission apparatus 1, and transmits the repeating-transmission signal to the repeating-transmission apparatus 1 (a13 in FIG. 4).

In the repeating-transmission apparatus 1, the LAN-signal repeater 12 converts the repeating-transmission signal transmitted from the repeating-transmission apparatus 2 back to the LAN signal and transmits the LAN signal to the auto-negotiation monitor 11. In the auto-negotiation monitor 11, the transmitted LAN signal is transmitted to the code discriminator 112 and the switch 3 (a16 in FIG. 4).

The code discriminator 112 performs code analysis for the transmitted LAN signal. Then, where the code discriminator 112 detects that the transmitted LAN signal is the auto-negotiation configuration code (a17 in FIG. 4), the code discriminator 112 transmits a notification to the alarm unit 113. Though the notification is transmitted from the code discriminator 112, the alarm unit 113 does not perform any operations, since it had received the notification transmitted from the code discriminator 111 (a18 in FIG. 4).

Thus, where a failure occurs in the optical fiber 102, the repeating-transmission apparatuses 1 and 2 detect the failure, based on the auto-negotiation configuration code transmitted from the switch 3, and an alarm is issued for notifying the monitor apparatus 5 of the failure.

Figure 5:
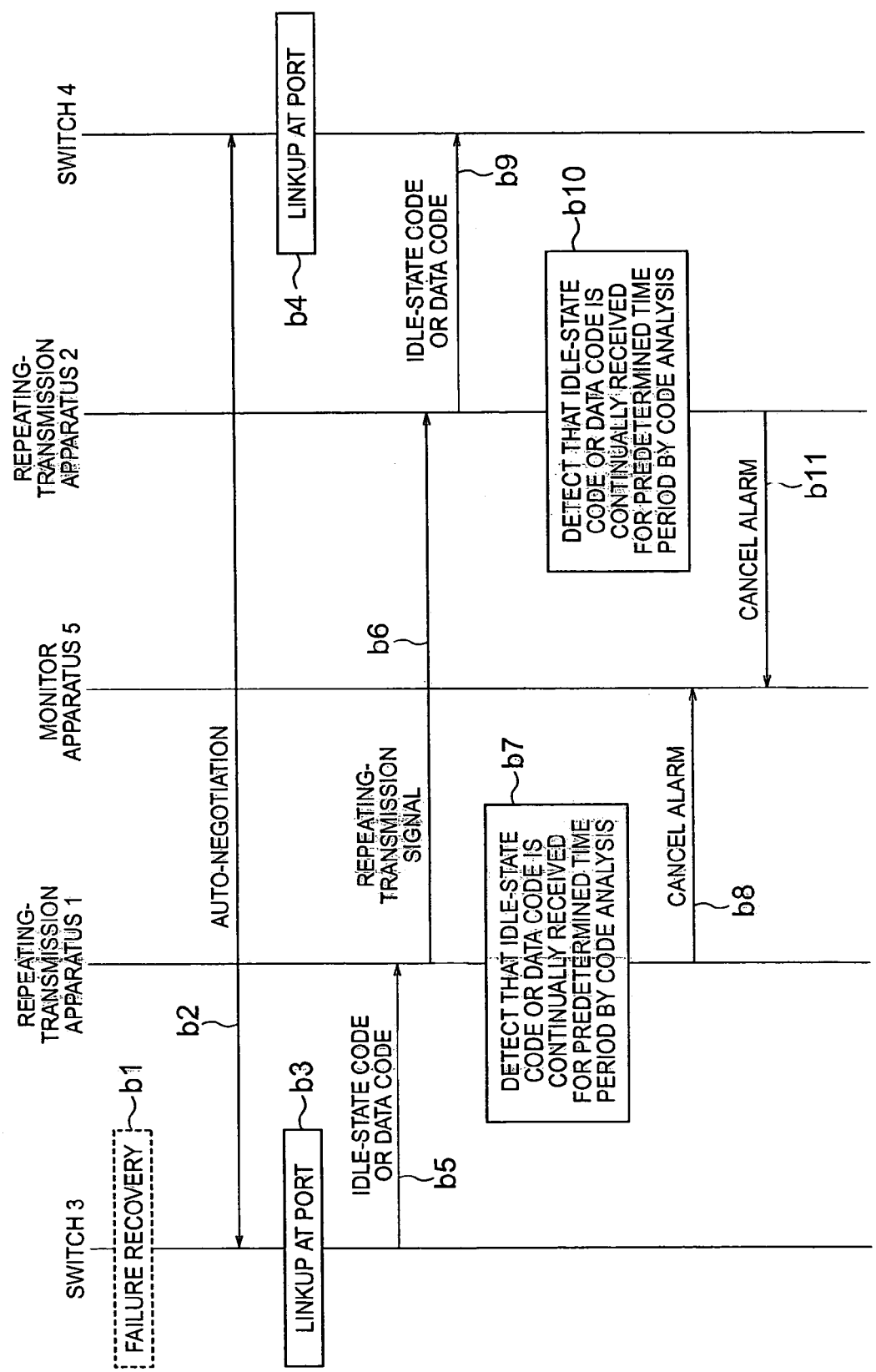
FIG. 5 is a sequence chart illustrating operations performed, at the time of failure recovery, in the auto-negotiation monitor system of the first embodiment.

FIG. 5 is a sequence chart illustrating operations performed at the time of failure recovery in the auto-negotiation monitor system of this embodiment. Operations performed, where the optical fiber 102 recovers from a failure, will now be described with reference to FIGS. 1 to 3 and 5.

In this embodiment, where the optical fiber 102 recovers from the failure (b1 in FIG. 5), auto negotiation is performed between the switches 3 and 4 (b2 in FIG. 5), and the port 31 of the switch 3 links up with the port 41 of the switch 4 (b3 and b4 in FIG. 5). Then, the switches 3 and 4 start transmitting the code indicating the idle state (I/Ordered set), or the code indicating data (/D/Code group, /S/Ordered set, and /T/Ordered set) (b5 in FIG. 5).

Upon receiving the LAN signal transmitted from the switch 3, the repeating-transmission apparatus 1 transmits the LAN signal to the auto-negotiation monitor 11. The auto-negotiation monitor 11 transmits the LAN signal to the code discriminator 111 and the LAN-signal repeater 12.

The code discriminator 111 performs code analysis for the transmitted LAN signal. Where the code discriminator 111 detects that it received the idle-state code, or the data code for a time period longer than the predetermined time period T1 (b7 in FIG. 5), the code discriminator 111 transmits data to the alarm unit 113 for canceling the alarm notification. Upon receiving the alarm notification, the alarm unit 113 cancels the alarm issued to the monitor apparatus 5 after the predetermined time period T2 elapses (b8 in FIG. 5).

Where the repeating-transmission apparatus 1 transmits the repeating-transmission signal to the repeating-transmission apparatus 2 (b6 in FIG. 5), the LAN-signal repeater 22 converts the transmitted repeating-transmission signal back to the LAN signal and transmits the LAN signal to the auto-negotiation monitor 21. The auto-negotiation monitor 21 transmits the LAN signal, that is, the idle-state code or the data code to the code discriminator 211 and the switch 4 (b9 in FIG. 5).

The code discriminator 211 performs code analysis for the transmitted LAN signal. Where the code discriminator 211 detects that it received the idle-state code, or the data code for a time period longer than the predetermined time period T1 (b10 in FIG. 5), the code discriminator 211 transmits data to the alarm unit 213 for canceling the alarm notification. Upon receiving the alarm notification, the alarm unit 213 cancels the alarm issued to the monitor apparatus 5 after the predetermined time period T2 elapses (b11 in FIG. 5).

Thus, according to this embodiment, the repeating-transmission apparatuses 1 and 2 can detect the failure recovery, based on the code of the LAN signal transmitted from the switch 3. Further, where the optical fiber 102 recovers from the failure, the repeating-transmission apparatuses 1 and 2 can cancel the alarm.

That is to say, in this embodiment, the repeating-transmission apparatuses 1 and 2 monitor the auto-negotiation configuration codes transmitted from the switches 3 and 4 opposed to each other. Therefore, the repeating-transmission apparatuses 1 and 2 can monitor the link state of the opposing switches 3 and 4 at all times.

Further, in this embodiment, since the repeating-transmission apparatuses 1 and 2 monitor both the auto-negotiation configuration code transmitted from the switch 3 and the auto-negotiation configuration code transmitted from the switch 4, it becomes possible to determine which of the switches 3 and 4 detected a failure and brought its link down.

Figure 6:
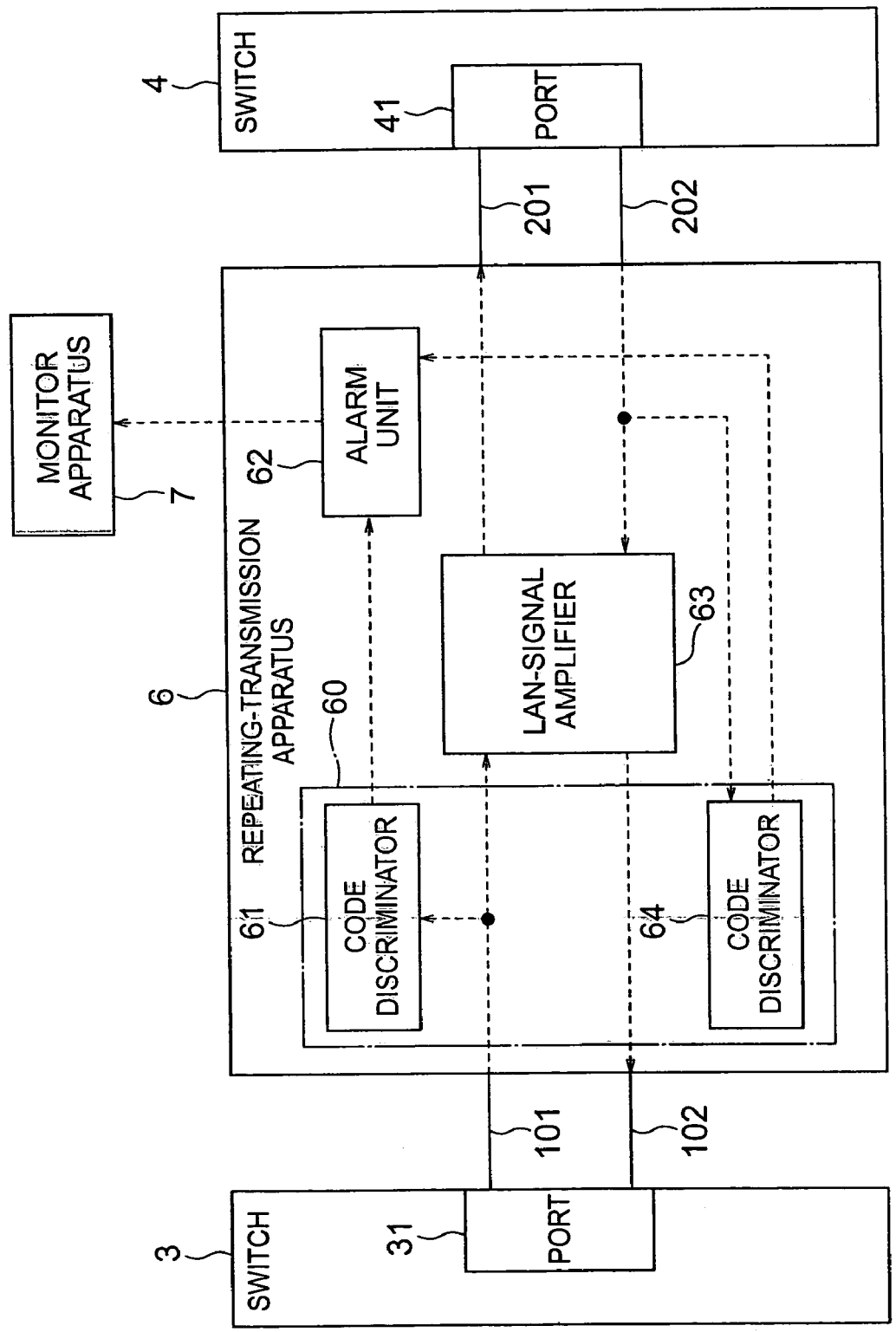
FIG. 6 is a block diagram illustrating the configuration of an auto-negotiation monitor system according to a second embodiment of the present invention.

FIG. 6 is a block diagram illustrating the configuration of an auto-negotiation monitor system according to a second embodiment of the present invention. Unlike the auto-negotiation monitor system of the first embodiment shown in FIG. 1, the auto-negotiation monitor system of this embodiment has one repeating-transmission apparatus.

A repeating-transmission apparatus 6 includes an LAN-signal amplifier 63. The LAN-signal amplifier 63 amplifies an LAN signal transmitted from the switch 3 and outputs the amplified LAN signal to the switch 4. Further, the LAN-signal amplifier 63 amplifies the LAN signal transmitted from the switch 4 and outputs the amplified LAN signal to the switch 3. Subsequently, the repeating-transmission apparatus 6 can increase an LAN-signal propagation distance between the switches 3 and 4. The repeating-transmission apparatus 6 further includes a code discriminator 61 (first code discriminator) for receiving the LAN signal transmitted from the switch 3, a code discriminator 64 (second code discriminator) for receiving the LAN signal transmitted from the switch 4, and an alarm unit 62 connected to the code discriminators 61 and 64. The code discriminators 61 and 64 may collectively called a code discrimination block 60.

The LAN signal transmitted from the switch 3 to the repeating-transmission apparatus 6 is input to the code discriminator 61 and the LAN-signal amplifier 63. The LAN signal is amplified and transmitted to the switch 4. The LAN signal transmitted from the switch 4 to the repeating-transmission apparatus 6 is input to the code discriminator 64 and the LAN-signal amplifier 63. The amplified LAN signal is transmitted to the switch 3.

The code discriminators 61 and 64 perform code analysis for the transmitted LAN signal. As a result, where the code of the LAN signal is determined to be the auto-negotiation configuration code, the code discriminators 61 and 64 transmit a notification to the alarm unit 62. Upon receiving the notification transmitted from the code discriminator 61, the alarm unit 62 issues an alarm to a monitor apparatus 7, where the alarm indicates that "the switch 3 detected a failure and brought its link down". Where the alarm unit 62 receives the notification transmitted from the code discriminator 64, the alarm unit 62 issues an alarm to the monitor apparatus 7, where the alarm indicates that "the switch 4 detected a failure and brought its link down". Here, where both the code discriminators 61 and 64 transmit the alarm to the alarm unit 62, the alarm unit 62 places a higher priority on the notification that had been transmitted earlier than the other.

Where the notification that caused the alarm unit 62 to issue the alarm for the monitor apparatus 7 and that was transmitted from the code discriminator is canceled, the alarm unit 62 cancels the alarm issued to the monitor apparatus 7 after the predetermined time period T1 elapses. Further, during the predetermined time period T2 after the above-described notification transmitted from the code discriminator is cancelled until the alarm issued to the monitor apparatus 7 is cancelled, the alarm unit 62 does not issue an alarm to the monitor apparatus 7 upon receiving another notification transmitted from the code discriminator.

Thus the auto-negotiation monitor system according to the present invention can monitor the link state of opposing switches at all times and determine which of the switches detected a failure and brought its link down.

What is claimed is:

1. An auto-negotiation monitor system for transferring local-area-network signals between opposing switches via at least one repeating-transmission apparatus and monitoring the at least one repeating-transmission apparatus and the opposing switches by a monitor apparatus, wherein the repeating-transmission apparatus comprises:

a code discrimination block that receives the local-area-network signal transmitted from each of the opposing switches and determines whether or not a predetermined code for auto-negotiation exists by monitoring the local-area-network signal, where the auto-negotiation is performed for establishing connection between the opposing switches; and an alarm unit for determining which of the opposing switches transmitted the predetermined auto-negotiation code that arrived earlier than the other, where the code discrimination block determines that the predetermined auto-negotiation code exists, and notifying the monitor apparatus of the determination result, as an alarm.

2. The auto-negotiation monitor system according to claim 1, wherein each of the opposing switches brings a link of its port down, where a failure occurs in an optical fiber on a reception side, and outputs the predetermined auto-negotiation code.

3. The auto-negotiation monitor system according to claim 2, wherein the repeating-transmission apparatus repeats and transfers the local-area-network signal without terminating a media-access-control layer.

4. The auto-negotiation monitor system according to claim 1, wherein the repeating-transmission apparatus is provided for each of said opposing switches and wherein each of the repeating-transmission apparatuses comprises an auto-negotiation monitor that is connected to the switch corresponding thereto via a reception-side optical fiber and a transmission-side optical fiber and that includes the code discrimination block and the alarm unit, and an LAN-signal repeater for repeating the local-area-network signal between the auto-negotiation monitor and the repeating-transmission apparatus opposed thereto.

5. The auto-negotiation monitor system according to claim 4, wherein the code discrimination block comprises:

a first code discriminator that receives the local-area-network signal transmitted from one of the opposing switches and that determines whether or not the predetermined auto-negotiation code exists by monitoring the transmitted local-area-network signal; and a second code discriminator that receives the local-area-network signal transmitted from the other of the opposing switches and that determines whether or not the predetermined auto-negotiation code exists by monitoring the transmitted local-area-network signal.

6. The auto-negotiation monitor system according to claim 1, wherein the repeating-transmission apparatus is provided between the opposing switches, connected to one of the opposing switches via reception-side and transmission-side optical fibers, and connected to the other of the opposing switches via reception-side and transmission-side optical fibers, wherein the code discrimination block comprises:

a first code discriminator that receives the local-area-network signal transmitted from one of the opposing switches and that determines whether or not the predetermined auto-negotiation code exists by monitoring the transmitted local-area-network signal; and a second code discriminator that receives the local-area-network signal transmitted from the other of the opposing switches and that determines whether or not the predetermined auto-negotiation code exists by monitoring the transmitted local-area-network signal, wherein the alarm unit determines which of the switches transmitted the predetermined auto-negotiation code that arrived earlier than the other, where one of the first and second code discriminators determines that the predetermined auto-negotiation code exists, and notifies the monitor apparatus of the determination result, as the alarm, and wherein the repeating-transmission apparatus further comprises an LAN-signal amplifier that amplifies the local-area-network signal transmitted from one of the opposing switches and outputs the amplified signal to the other of the opposing switches, and that amplifies the local-area-network signal transmitted from the other of the opposing switches and outputs the amplified signal to said one of the opposing switches.

7. A repeating-transmission apparatus that is provided between opposing switches for repeating and transferring a local-area-network signal and that is monitored by a monitor apparatus, with the opposing switches, the repeating-transmission apparatus comprising:

a code discrimination block that receives the local-area-network signal transmitted from each of the opposing switches and determines whether or not a predetermined code for auto-negotiation exists by monitoring the local-area-network signal, where the auto-negotiation is performed for establishing connection between the opposing switches, and an alarm unit for determining which of the switches transmitted the predetermined auto-negotiation code that arrived earlier than the other, where the code discrimination block determines that the predetermined auto-negotiation code exists, and notifying the monitor apparatus of the determination result, as an alarm.

8. The repeating-transmission apparatus according to claim 7, wherein each of the opposing switches brings a link of its port down, where a failure occurs in an optical fiber on the reception side, and outputs the predetermined auto-negotiation code.

9. The repeating-transmission apparatus according to claim 8, wherein the repeating-transmission apparatus repeats and transfers the local-area-network signal without terminating a media-access-control layer.

10. The repeating-transmission apparatus according to claim 7, wherein the code discrimination block comprises:

a first code discriminator that receives the local-area-network signal transmitted from one of the opposing switches and that determines whether or not the predetermined auto-negotiation code exists by monitoring the transmitted local-area-network signal; and a second code discriminator that receives the local-area-network signal transmitted from the other of the opposing switches and that determines whether or not the predetermined auto-negotiation code exists by monitoring the transmitted local-area-network signal.

11. The repeating-transmission apparatus according to claim 10, wherein the repeating-transmission apparatus further comprises an LAN-signal amplifier that amplifies the local-area-network signal transmitted from one of the opposing switches and outputs the amplified signal to the other of the opposing switches, and that amplifies the local-area-network signal transmitted from the other of the opposing switches and outputs the amplified signal to said one of the opposing switches.

12. An auto-negotiation monitor method for transferring local-area-network signals between opposing switches opposed to each other via at least one repeating-transmission apparatus and monitoring the repeating-transmission apparatus and the opposing switches by a monitor apparatus, the auto-negotiation monitor method comprising the steps of:

receiving the local-area-network signal transmitted from each of the opposing switches, determining whether or not a predetermined code for auto-negotiation performed for establishing connection between the opposing switches exists by monitoring the transmitted local-area-network signal, determining which of the opposing switches transmitted the predetermined auto-negotiation code that arrived earlier than the other, where the existence of the predetermined auto-negotiation code is determined, and notifying the monitor apparatus of the determination result, as an alarm.

13. The auto-negotiation monitor method according to claim 12, wherein each of the opposing switches brings a link of its port down, where a failure occurs in an optical fiber on the reception side, and outputs the predetermined auto-negotiation code.

* * * * *